March 31, 1964     L. A. LITSKY     3,126,613
METHOD OF MAKING SELF-ALIGNING BEARINGS
Filed March 15, 1961     2 Sheets-Sheet 1
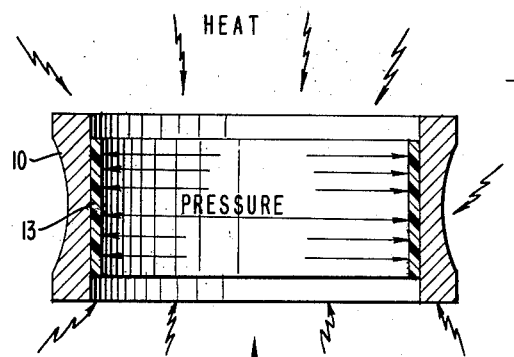
Fig. 4
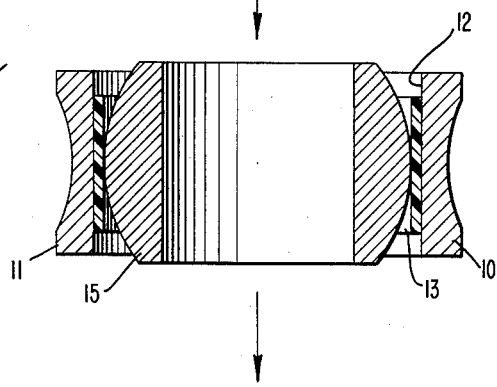
Fig. 5
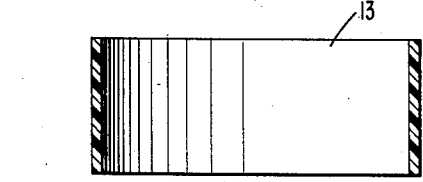
Fig. 3
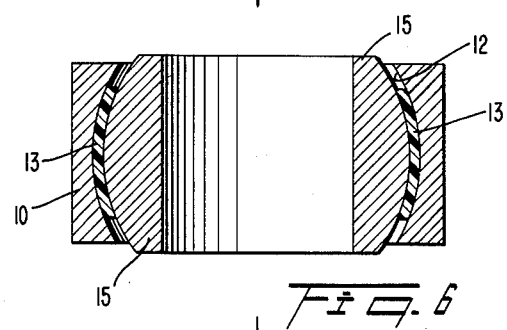
Fig. 6
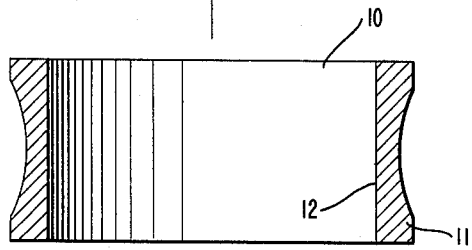
Fig. 2
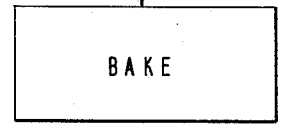
Fig. 7
Fig. 1
INVENTOR.
LEONARD A. LITSKY
BY
Roy C. Hopgood
ATTORNEY

INVENTOR.
LEONARD A. LITSKY

United States Patent Office

3,126,613
Patented Mar. 31, 1964

3,126,613
METHOD OF MAKING SELF-ALIGNING
BEARINGS
Leonard A. Litsky, New Britain, Conn., assignor to The
Fafnir Bearing Company, New Britain, Conn., a corporation of Connecticut
Filed Mar. 15, 1961, Ser. No. 96,006
8 Claims. (Cl. 29—149.5)

This invention, generally, relates to the manufacture of bearings and, more particularly, to a new and improved method of making self-aligning bearings.

In the manufacture of one form of self-aligning bearings, an outer ring is prepared with a suitable liner material, and the inner ring is inserted before the rims of the outer ring are swaged. It has been difficult in the past to maintain the position of the linear material accurately during the swaging operation and, in most instances to control the degree of fit between the inner ring and the liner material; that is, the inner ring would either be too loose or too tight unless extreme care was exercised during manufacture.

Accordingly, it is an object of this invention to provide a new and improved method of making self-aligning bearings having a liner material between the inner and outer rings.

Another object of the present invention is to provide a method of manufacturing a self-aligning bearing to provide predetermined frictional characteristics.

A further object of the invention is to provide a new and improved method of manufacturing a self-aligning type bearing to control the fit between the inner ring and the liner material.

Another object of the invention is to provide a new and improved method of making a self-aligning type bearing whereby the fit of the inner ring within the liner material may be controlled.

Briefly, the method of the invention contemplates an outer bearing ring formed with a suitable liner material. The forming of the outer bearing ring with the liner material is accomplished by any suitable means, such as the application of both heat and pressure to the assembled ring and liner.

With the liner bonded within the outer bearing ring, a bearing ball is inserted, and the outer ring is deformed by any suitable means such that the contact surfaces conform generally and produce a relatively tight connection.

Finally, to complete the assembly, the bearing unit is subjected to an elevated temperature for a predetermined length of time, the magnitude of the temperature and the length of time being selected in accordance with the invention to produce a desired internal freedom of the bearing ball in terms of no-load starting torque.

In the description of the invention, the term "bearing ball" is understand to refer in its broadest aspects to an inner member having a boundary portion of generally spherical contour to match the inner surface of the outer bearing ring. Since a self-aligning bearing is used primarily at an oscillating joint connection, the term "bearing ball" need not necessarily be limited to a ball-like or spherical inner member which has two opposite spherical segments removed and a hole therein to receive a rod or shaft to be supported. Obviously, the term "bearing ball" could refer to a substantially complete sphere with a projection for attachment with a rod or shaft. The outer spherical surface on the bearing ball preferably is highly polished and may be finished to any suitable degree and by any suitable means.

For a more complete understanding of these and other objects of the present invention, reference may be had to the description which follows and to the accompanying drawings, in which:

FIG. 1 is a view in cross section of an outer bearing ring;

FIG. 2 is a view in cross section of a liner material;

FIG. 3 is a view showing the liner material for FIG. 2 positioned within the outer ring of FIG. 1;

FIG. 4 is a view in elevation, partly in cross-section illustrating one method of obtaining a bond between the liner and the outer ring;

FIG. 5 shows the liner material bonded to the inner surface of the outer ring, and the bearing ball positioned within the outer ring prior to deformation;

FIG. 6 shows a view similar to FIG. 5 after the peripheries of the outer ring has been deformed and finished;

FIG. 7 is a diagrammatic illustration of the final step in the method of the invention, which includes a baking process.

Figure 8:
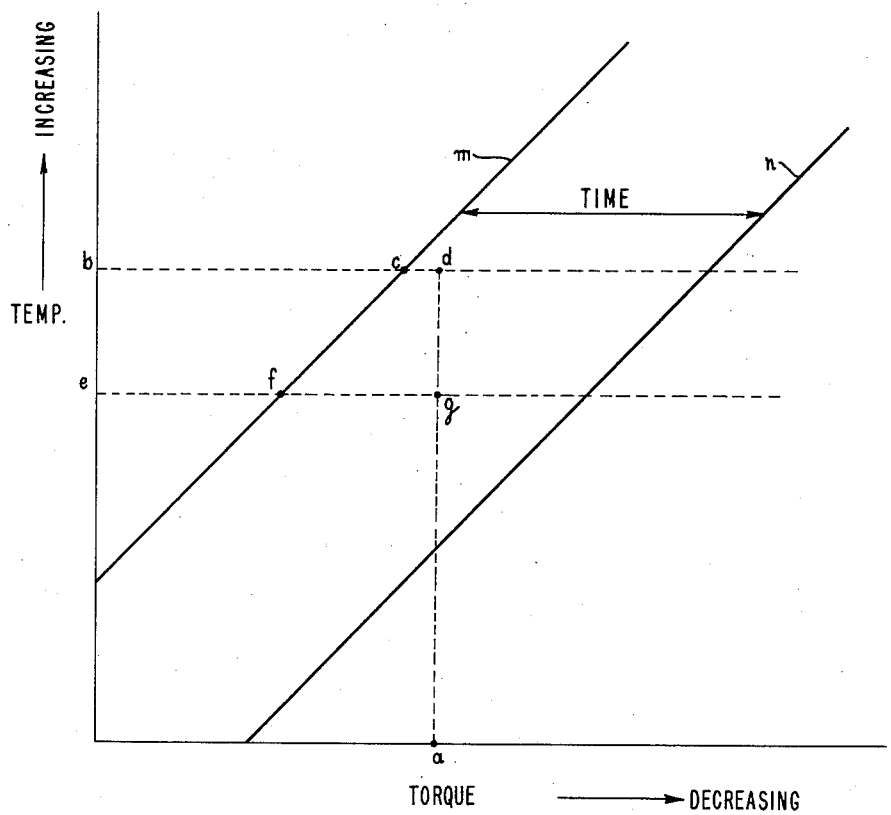
FIG. 8 is a diagrammatic chart illustrating a temperature-time-torque relationship.

In accordance with the method of the invention, the outer ring 10, FIG. 1, is formed initially with a substantially cylindrical outer surface 11 and matching inner surface 12. The exact dimensions of the outer diameter and the inner diameter of the ring 10 are obtained, preferably, by suitable automatic machinery.

Depending upon the particular application to which the completed bearing is to be put, the ring 10 is heat treated apropriately to obtain the desired characteristics, which heat treating may include annealing, hardening, and tempering, as desired. Such heat treating steps are well known in the art, and therefore, a detailed description thereof is deemed unnecesary here.

After heat treating, the bore of the ring 10, i.e., the inner surface 12 is ground and polished to a final dimension. Thus formed, the ring 10 provides not only a means for attaching the bearing for use in a particular installation, but provides the supporting body to which a liner material 13, FIG. 2, is attached either directly or by the use of a suitable adhesion or bonding material, which will be described in more detail presently.

While any suitable lining material 13 may be used, the invention contemplates the use of a low friction fabric material with fibers having low frictional characteristics, including the polyamide resins marketed under the name of "nylon," the polyester resins marketed under the Du Pont trade name "Dacron," polyethylene, the polymeric fluorocarbon resins, including tetrafluoroethylene, marketed under the Du Pont trade name "Teflon," and the monochloro-tetrafluoro-ethylene resins marketed under the trade name of "Kel-F" and "Fluorothene." Of course, other materials are available, the above being merely illustrative, and for the purposes of this description, the tetrafluoroethylene resins are preferred to the other resin fibers, since they withstand approximately 600° F. of temperature.

The low friction fiber materials, such as illustrated above, in most cases do not bond readily with other materials, and in order to assure a good bond, bondable fibers are woven on the reverse side of the woven low friction fibers, so that on the working face of the resulting woven material, a low friction surface will be provided, and on the opposite face a bondable surface will be provided. By this weaving, it is assured that the low friction fibers will be retained in position at all times, since the bondable fibers are positively retained in position on the supporting body, i.e., the ring 10.

By way of example, suitable backing materials which have been woven successfully with the polymeric fluorocarbon resins for the purpose of providing bonding fibers include cotton, rayon, nylon, wool, copper, steel, glass and the like.

In accordance with a preferred form of the invention, a suitable adhesive is applied to the inner surface 12 of the outer ring 10, and in addition, this adhesive is applied to a Teflon fabric prior to cutting to size. Several coats of the adhesive may be necessary on the fabric.

After the second coat of adhesive has dried, the Teflon fabric is cut into strips at the desired length to fit a particular bearing size. The liner material then is inserted within the ring 10, the adhesive side facing the adhesive side, this material being illustrated by the numeral 13 in FIG. 2 of the drawings.

Any suitable means may be used to position the liner material 13 within the ring 10, such as a hand or fluid operated fixture. With the liner in position within the ring 10, the assembly will appear as shown in FIG. 3 of the drawings.

With the parts as shown in FIG. 4 of the drawing and with the pressure applied radially outwardly against the liner material 13, heat is applied to the assembly to a sufficient degree and for a sufficient length of time to achieve a good bond between the liner 13 and the outer ring 10. The specific temperature and the specific length of time will vary, depending upon the particular adhesive used, for example. The combination of the pressure and the heat results in a very satisfactory bond between the liner material 13 and the inner surface 12 of the ring 10.

For illustrative purposes only, it is suggested that in one instance the units may be baked at 375° F. for one hour to cure the adhesive and bond the liner in place.

An inner ring is indicated generally by the numeral 15 in FIG. 5 and is machined automatically to obtain the spherical outside diameter and bore diameter as desired. In addition, the inner ring 15 may be heat treated similarly as the outer ring 10 or by any other heat treating schedule as desired, again in accordance with the particular use to which the bearing will be placed.

Also, both the outer face and the bore of the inner ring 15 are ground to a finished surface similarly as the bore 12 of the outer ring 10, described previously. If desired, the inner ring 15 may be burnished in a tumbling barrel.

After pretreating the inner ring 15 as described above, it is inserted within the bore of the liner 13, as illustrated in FIG. 5, and then by any suitable means, the outer ring 10 is deformed, for example, by swaging or the like to make the inner surface conform substantially to the spherical surface of the inner ring 15, as shown in FIG. 6. After the swaging, the outer face of the ring 10 may be turned on a suitable machine, such as a lathe, to finish the outer peripheral surface 11 thereof, as desired.

It has been found as a practical matter, that the inner ring 15 does not present the desired degree of looseness at this stage of the manufacture, and many attempts have been made in the past to obtain by some means the desired fit. This fact results from the residual radial stress between inner and outer rings after initial assembly, and the inadequate looseness is identified with excessive torque required to produce relative rotation of the rings.

In accordance with a principal aspect of the present invention, therefore, a desired degree of looseness may be obtained by an additional step in the method described above. Such step includes baking the completed assembly at a predetermined temperature for a predetermined length of time.

While the exact degree of temperature and the exact time must necessarily be obtained experimentally for a particular bearing to be treated, extensive tests have indicated that the temperature and time may be predicted and, thus, predetermined within a desirable range. By way of illustration, the following chart shows that not only may bearings be freed by the additional baking step, but that the degree of internal freedom within the bearing in terms of ounce-inches of no-load starting torque, can be controlled with a give time-temperature relationship:

| Temp., °F. | Time, hours | | | | | |
|---|---|---|---|---|---|---|
| | ½ | 1 | 2 | 3 | 4 | 8 |
| 350 | NL | NL | X | | X | X |
| 400 | X | X | X | X | X→ | TL |
| 450 | X | X | X→ | TL | | |
| 500 | X | X→ | | TL adhesive burned. | | |

X represents areas where varying degrees of looseness were found for bearing tested.
NL = Not loosened.
TL = Too loose.

The above chart indicates that the amount of freedom within the bearing is dependent directly upon the time-temperature relationship. The longer the time at a particular temperature, the looser the bearing, and conversely, the higher the temperature, the shorter the time duration needed for a given amount of looseness.

The specific values shown in the chart, of course, are for one size bearing. Obviously, different specific values will be required for different size bearings. In other words, to obtain a desired looseness, a higher or lower temperature will be required depending upon the bearing size.

A significant result which was obtained from the above tests indicates that the type of adhesive used and the weave of the fabric does not seem to affect the end result. It appears that the freeing up of the bearing is a stress relieving operation.

It is known that work-hardened metals are in a state of high internal energy which is exhibited by distorted lattices of dislocated atoms in unstable states. However, when such atoms are subjected to elevated temperatures, the atoms achieve sufficient mobility to find stable positions, and the effect on the metal is an annealing process, sometimes called "stress relieving" or "recovery." It is believed that this stress relieving characteristic of the completed bearing is the factor which produces the freeing results described above; moreover, it is necessary that the liner and inner ring be of different materials, at least one of which will undergo plastic deformation in the presence of sufficient heat and pressure.

Referring now to FIG. 8 of the drawings, the $y$-axis represents increasing temperature upwardly, and the $x$-axis represents decreasing starting torque to the right. The two sloping lines $m$ and $n$ are spaced apart by a distance which represents time.

Therefore, to illustrate the baking step of the invention further, assume that for a paricular bearing assembly it is determined that a temperature $e$ for a period of time $f$—$g$ is required to obtain a looseness $a$ in the bearing. It will be true also that the same looseness $a$ will be obtained by baking the bearing at a higher temperature $b$ for a shorter period of time $c$—$d$.

The second condition at the higher temperature assumes that the particular adhesive used to bond the Teflon fabric liner to the outer bearing ring will not be damaged. Usually, it is the ability of the adhesive to resist deterioration at elevated temperatures that determines the maximum baking temperature.

The following claims are intended to define the valid scope of this invention over the prior art and to cover all changes and modifications falling within the true spirit and scope of the invention.

I claim:

1. A method of producing an antifriction bearing having an outer ring and an antifriction liner bonded therein, comprising the steps of placing the antifriction liner within the outer ring, bonding the assembled ring and liner to each other under conditions of heat and pressure, assembling an inner ring within said liner and outer ring, deforming said outer ring and liner into radially stressed engagement with said inner ring, whereby excessive torque is required for relative rotation of the inner ring and of the lined outer ring with respect to each other, said liner and said inner ring being of different materials at least one of which will undergo plastic deformation in the presence of sufficient heat and pressure, and heating the assembled bearing to a predetermined temperature for a predetermined length of time to relieve said stress and thereby obtain a preselected degree of looseness.

2. A method of producing a bearing having an outer ring and an antifriction liner bonded therein, comprising the steps of placing the antifriction liner within the outer ring, heating the assembled ring and liner to a temperature sufficiently high to cause bonding of the liner to the ring while applying pressure radially outwardly against the liner, cooling the liner and outer ring, inserting a bearing ball inner ring member within the bore of the liner and outer ring, deforming the liner and outer ring to substantially fit said inner ring with residual radial stress, said liner and inner ring being of different materials at least one of which will undergo plastic deformation in the presence of sufficient heat and pressure, and heating said bearing to a predetermined temperature for a predetermined length of time to relieve said stress and thereby develop a predetermined degree of looseness between said inner and outer rings.

3. A method of producing a bearing having an outer ring and an antifriction liner bonded therein, comprising the steps of placing the antifriction liner within an outer bearing ring, applying a substantially uniform pressure radially outwardly against said liner, heating the ring and liner to a temperature sufficiently high to cause bonding of the liner to the ring, assembling an inner ring within the liner and outer ring, deforming the outer ring a predetermined degree toward said inner ring with residual radial stress between said rings, said liner and inner ring being of different materials at least one of which will undergo plastic deformation in the presence of sufficient heat and pressure, and baking said bearing to obtain a predetermined degree of looseness.

4. A method of producing a bearing having an outer ring and an antifriction liner bonded therein, comprising the steps of placing the antifriction liner within an outer bearing ring, applying a substantially uniform pressure radially outwardly against said liner, heating the assembled ring and liner to a temperature sufficiently high to cause bonding of the liner to the ring while said pressure is being applied, cooling said liner and outer bearing ring, inserting a bearing ball inner ring member within the bore of the liner and outer ring, deforming the liner and outer ring to substantially fit said inner ring with residual radial stress between said rings, said liner and inner ring being of different materials at least one of which will undergo plastic deformation in the presence of sufficient heat and pressure, and heating said bearing to a predetermined temperature for a predetermined length of time to develop a predetermined degree of looseness between said inner and outer rings.

5. A method of producing a bearing having an outer ring and an antifriction liner bonded therein, comprising the steps of applying a coating of adhesive to at least the liner, placing the outer ring over the antifriction liner, heating the liner and ring to a temperature sufficiently high to cause bonding of the liner to the ring, whereby the bonding of the liner to the ring is effected, placing an inner ring within said bonded liner and outer ring, deforming said outer ring toward said inner ring with resulting excessive residual stress between said rings, said liner and inner ring being of different materials at least one of which will undergo plastic deformation in the presence of sufficient heat and pressure, and baking the assembled bearing to loosen the inner ring with respect to the lined outer ring.

6. A method of producing a bearing having an outer ring and an antifriction liner bonded therein, comprising the steps of applying a coating of adhesive to at least the liner, placing the outer ring over the antifriction liner, heating the liner and ring to a temperature sufficiently high to cause bonding of the liner to the ring while applying pressure radially outwardly against the liner, whereby the combined heat and pressure effect bonding of the liner to the ring, cooling the ring and liner and removing said pressure, inserting a bearing ball inner ring member within the bore of the liner and outer ring, deforming the liner and outer ring to substantially fit said inner ring with residual radial stress, said liner and inner ring being of different materials at least one of which will undergo plastic deformation in the presence of sufficient heat and pressure, and heating said bearing to a predetermined temperature for a predetermined length of time to develop a predetermined degree of looseness between said inner and outer rings.

7. A method of producing a bearing having an outer ring and an antifriction liner bonded therein, comprising the steps of applying to a Teflon fabric liner material a coating of an adhesive, placing the liner material within an outer bearing ring, heating the assembled ring and liner to a temperature sufficiently high to cause bonding of the liner to the ring while applying substantially uniform pressure radially outwardly against the liner, deforming the assembled outer ring and liner about an inner ring with residual radial stress, the material of said inner ring being different from that of said liner, and baking the finished bearing at a predetermined temperature for a predetermined length of time to loosen the fit of said liner and said inner ring.

8. A method of producing an antifriction bearing having an outer ring and an antifriction liner bonded therein, comprising the steps of applying to a Teflon fabric liner material a coating of an adhesive, applying a coating of adhesive to the inner surface of said outer bearing ring, placing the liner material within an outer bearing ring, heating the ring and liner to a temperature sufficiently high to cause bonding of the liner to the ring while applying substantially uniform pressure radially outwardly against the liner, cooling the liner and outer ring, inserting a bearing ball inner ring member within the bore of the liner and outer ring, deforming the liner and outer ring to substantially fit said inner ring with residual radial stress, the material of said inner ring being different from that of said liner, and heating said bearing to a predetermined temperature for a predetermined length of time to develop a predetermined degree of looseness between said inner and outer rings.

References Cited in the file of this patent
UNITED STATES PATENTS

| | | |
|---|---|---|
| 2,462,138 | Spangenberg | Feb. 22, 1949 |
| 2,835,521 | White | May 20, 1958 |
| 2,838,436 | Clingman | June 10, 1958 |